J. F. BRAUN.
GANG MOWER.
APPLICATION FILED JULY 1, 1916.

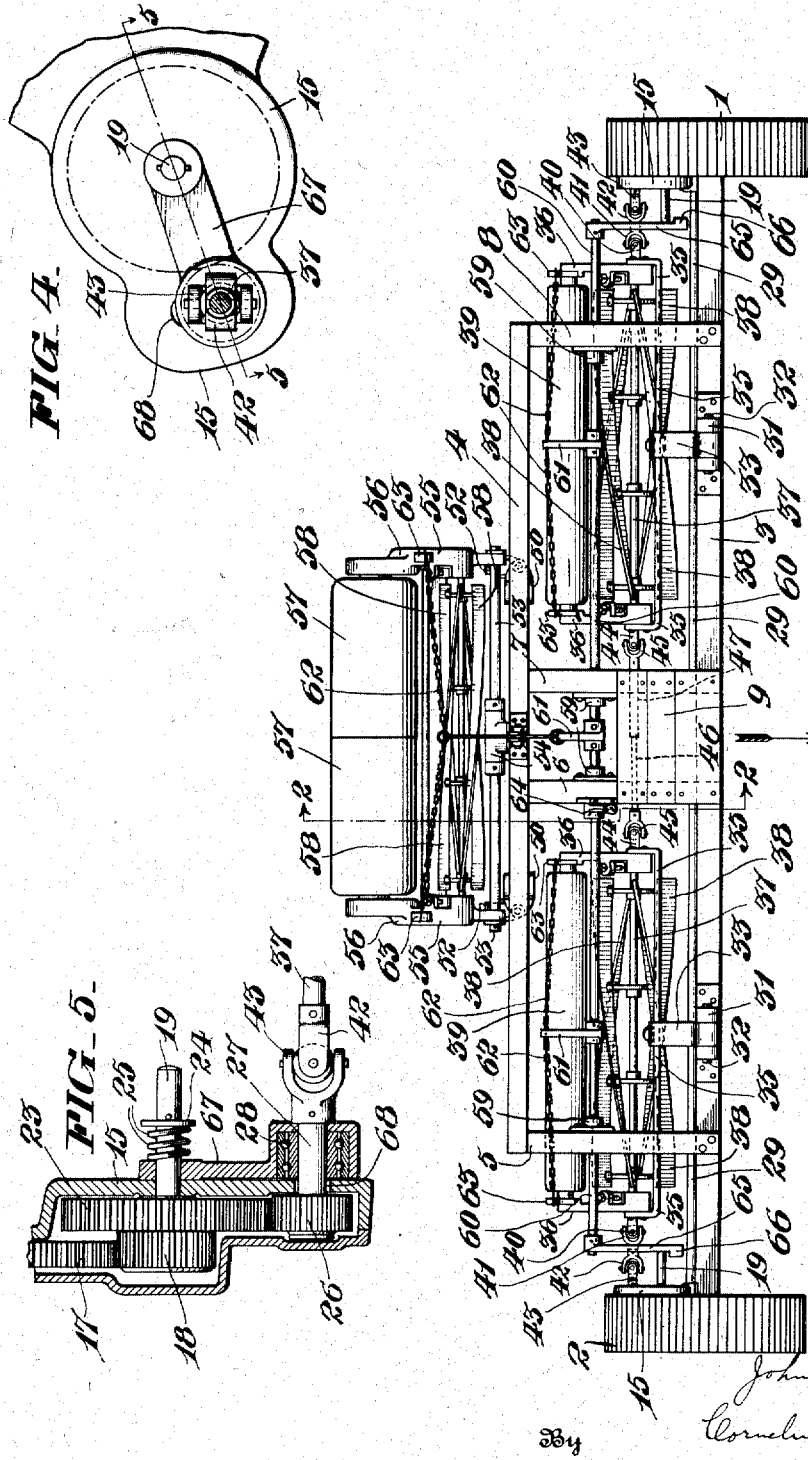

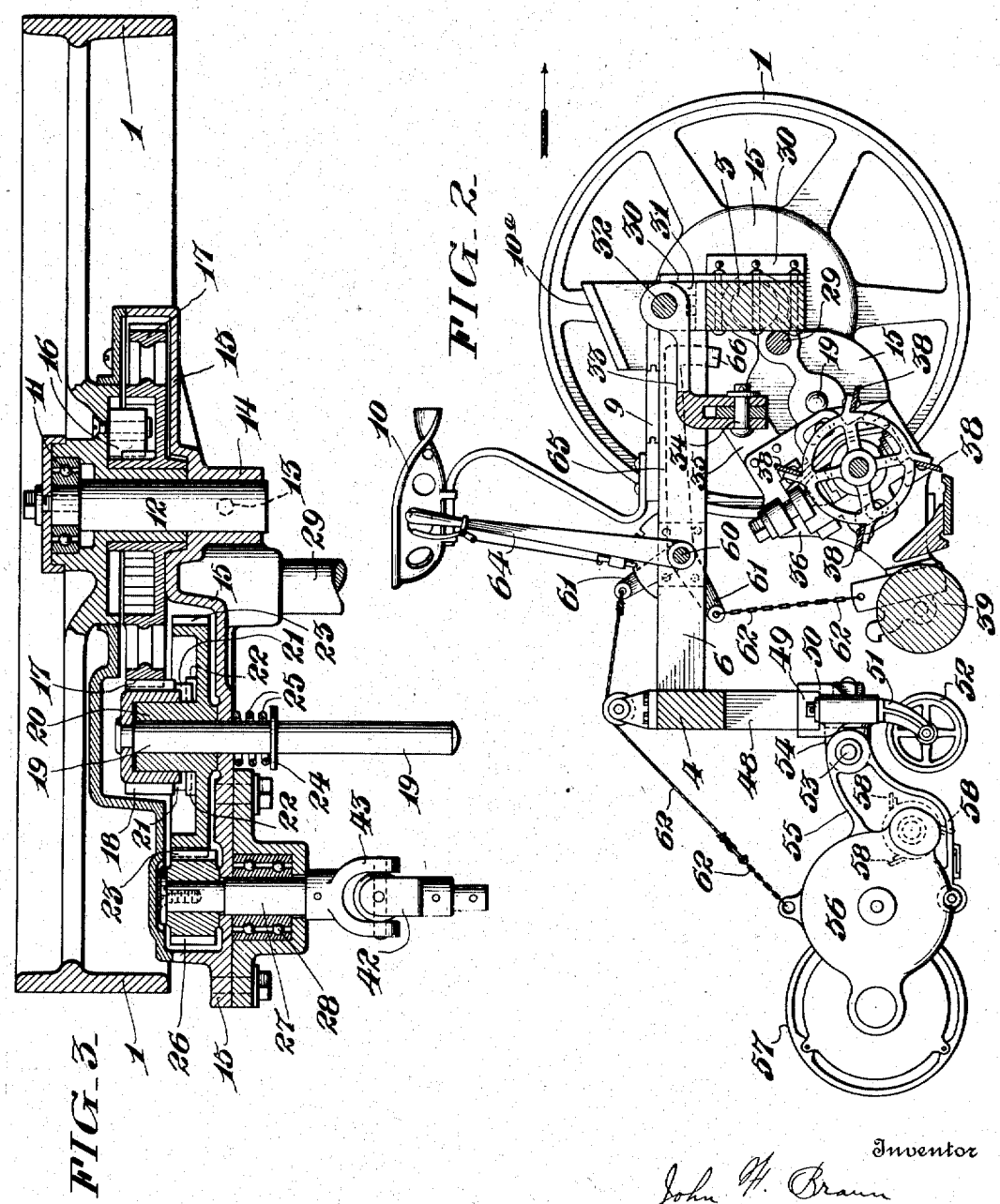

1,235,649.

Patented Aug. 7, 1917.
3 SHEETS—SHEET 3.

Inventor
John H. Braun
Cornelius D. Ehret

By

His Attorney

UNITED STATES PATENT OFFICE.

JOHN F. BRAUN, OF MERION, PENNSYLVANIA, ASSIGNOR TO PENNSYLVANIA LAWN MOWER WORKS, OF PHILADELPHIA, PENNSYLVANIA, A CORPORATION OF PENNSYLVANIA.

GANG-MOWER.

1,235,649.   Specification of Letters Patent.   Patented Aug. 7, 1917.

Application filed July 1, 1916.   Serial No. 107,007.

*To all whom it may concern:*

Be it known that I, JOHN F. BRAUN, a citizen of the United States, residing at Merion, county of Montgomery, and State of Pennsylvania, have invented certain new and useful Improvements in Gang-Mowers, of which the following is a specification.

It is the object of my invention to provide a gang lawn mower comprising a plurality of individual rotary cutting mechanisms driven through universal joints by gearing driven by lawn engaging wheels which may also serve as wheels of the frame or body of the apparatus upon which may ride a driver or operator; and it is a further object of my invention to provide in such apparatus means whereby the gang mower may take a curvilinear path or turn corners, and means for permitting the individual cutter mechanisms to accommodate themselves to variations of the lawn surface falling within their paths; with these and other objects in view it will be understood that my invention resides in a gang lawn mower of which those hereinafter described are examples.

For an illustration of some of the forms my invention may take, reference may be had to the accompanying drawings, in which:

Figure 1 is a top plan view of a gang mower comprising individual cutter mechanisms driven in common from the frame or vehicle wheels and an individual mower unit whose cutter mechanism is separately driven from its ground engaging wheels or rollers.

Fig. 2 is a sectional view on the line 2—2, Fig. 1, some parts being shown in elevation, the parts in Fig. 2 being on a larger scale than illustrated in Fig. 1.

Fig. 3 is a sectional view, on larger scale, of one of the frame or vehicle wheels and the associated train of gearing and a universal joint driven thereby.

Fig. 4 is a fragmentary side elevational view of a modified form of gear drive.

Fig. 5 is a sectional view, some parts in elevation, taken on the line 5—5 of Fig. 4.

Fig. 6 is a top plan view, of parts below the line 6—6 of Fig. 7, of a gang mower in which all of the cutter mechanisms are driven through universal joint connections from the gearing driven by common lawn engaging wheels.

Fig. 7 is a cross sectional view, some parts in side elevation, on larger scale, of a gang mower of the character shown in Fig. 6.

Fig. 8 is a sectional view taken on the line 8—8 of Fig. 6.

Referring to the drawings, 1 and 2 are lawn engaging wheels which also serve as the wheels for a frame or vehicle body comprising the transversely extending sills 3 and 4 and the connecting sills 5, 6, 7 and 8. Upon the sills 6 and 7 may be placed the small platform or floor 9 upon which may be secured the driver's seat 10 and foot rest 10ª, the apparatus as a whole being drawn forwardly by horses or otherwise, the direction of movement being indicated by the arrows in Figs. 1 and 2.

Either or both of the wheels 1 and 2 may drive mechanism as indicated in Fig. 3 or as illustrated in Figs. 4 and 5.

In Fig. 3 the lawn engaging wheel 1 rotates upon a ball bearing 11 upon the short shaft 12 secured by pin 13 in the lug 14 on the gear casing 15. A dog 16 carried by the wheel 1 engages in one direction of movement of the wheel 1 and drives the gear wheel 17 which meshes with and drives the pinion 18 freely rotatable upon and movable laterally with the pin or shaft 19 extending through the hub 20. The pinion 18 has lugs or teeth 21 engaging, in the position illustrated, the lugs 22 on the gear wheel 23 having the hub 20 by which it rotates freely upon the short shaft 19. The shaft 19 extends to the outside of the gear casing 15 and carries a collar 24 between which and the gear casing 15 is a spring 25 which thrusts the pin 19 to hold the parts in the position illustrated. This arrangement constitutes a clutch hereinafter referred to.

The gear 23 drives the pinion 26 secured upon the short shaft 27 having the ball bearing 28 supported on the gear casing 15.

Extending across the gang mower is the ing 28 supported on the gear casing 15.

And by brackets 30, Fig. 2, the sill 3 is secured to the gear casings 15 of the wheels 1 and 2.

Supported in brackets 31 on the sill 3 are the horizontal pivots 32 upon which are pivoted the arms 33 carrying at their rear and lower ends the pivot pins 34, Fig. 2, upon which are pivoted the members 35 secured to the side frame members 36 of the cutter mechanism comprising the rotary shaft 37 having bearings in the members 36 and carrying the usual cutter blades 38. The ground engaging rollers 39 are also carried by the members 36.

The outer ends of the shafts 37 are connected to the driven members 40 of universal joints whose driving members 41 are connected by short shafts to the driven members 42 of universal joints whose driving members 43, Figs. 1 and 3, are secured upon the shafts 27 driven by the lawn engaging wheels 1 and 2.

On the inner ends of the shafts 37 are secured the members 44 of universal joints whose other members 45 are secured respectively upon the shaft 46 and the sleeve 47 which are capable of telescoping with respect to each other but one of them positively driving the other, as by an arrangement similar to that illustrated in Fig. 8 hereinafter referred to.

To the rear transverse sill 4 of the frame are secured downwardly extending members 48 connected at their lower ends by the transversely extending member 49 upon which are secured the brackets 50, in which are pivoted on vertical axes the casters 51 having the ground engaging rollers 52.

The transversely extending rod 53 of an individual mower unit has a horizontal bearing 54 secured to the member 49. The rod 53 is secured at its ends in the members 55 secured to or forming part of the gear casing 56 for gearing driven by the ground engaging rollers 57, 57 and driving the rotary cutting mechanism 58.

In bearings 59 carried by the sills 5, 6, 7 and 8 is supported the shaft 60 upon which are secured the several lever arms 61 to whose outer ends are connected the cords or chains 62 connected to the ears 63 on the members 36 of the front cutting mechanisms and on the members 56 of the rear mower unit. Secured upon the shaft 60 is the operator's lever 64 and also the levers or arms 65 having at their outer and lower ends the inclined or cam surfaces 66 for engaging and actuating the pins or shafts 19.

The operation is as follows:

As the gang mower is drawn forwardly the wheels 1 and 2 drive their respective gear mechanisms and through them the universal joints 43, 42 which in turn rotate the shafts 37 carrying the cutter blades, and these shafts are interconnected by the shaft and sleeve 46 and 47 connected to the respective shafts 37 through universal joints 44, 45. The cutter mechanisms in rotating cut the grass in the well known manner. And the individual rear mower unit is dragged along over the lawn and cuts a swath overlapping the swaths cut by the front cutter mechanisms, the rollers 57 of the rear mower unit rotating the cutters 58 independently of wheels 1 and 2.

The front cutter mechanisms are capable of rising and falling with variations of the lawn surface due to the horizontal pivots 32 and are capable of tilting laterally to accommodate themselves to lateral variations in the lawn surface by the pivotal movement of the members 35 upon the pivots 34. And the rear mower unit is capable of rising and falling about the shaft 53 as a center which is pivoted in the bearing 54.

As the forward cutter mechanisms tilt upon their pivots and as the gang mower as a whole takes a curvilinear path or turns a corner, the cutter mechanisms are nevertheless actuated and rotated and maintain their driving relation with the wheels 1 and 2 and are interconnected by the shaft 45 and sleeve 47, the universal joints yielding in any direction necessary for smooth and easy operation.

When it is desired to lift the cutter mechanisms free from the operative position the lever 64 is rotated in a clockwise direction, Fig. 2, rotating the shaft 60 in like direction and therefore the arms 61 in like direction, pulling up upon the cords or chains 62 and so lifting the forward cutting mechanisms on their pivots 32 and raising the rear individual mower upon the pivotal shaft 53.

Simultaneously with the aforementioned actuation of the shaft 60 the lever arms 65 are rotated and their cam surfaces 66 engage the outer rounded ends of the pins or shafts 19 and push them inwardly in opposition to their springs 25 and so move the pinions 18, remaining in mesh with the gears 17, until the teeth 21 disengage from the lugs 20, whereupon the shafts 28 are no longer driven by the wheels 1 and 2 which may continue to roll over the ground. And since the rear individual mower is raised as a unit about its pivotal axis 53, the rollers 57 being freed from the ground no longer drive the cutters 58.

In Figs. 4 and 5 is shown an alternative gear drive which may be used either in connection with the apparatus shown in Figs. 2 and 3 or that shown in Figs. 6 and 7.

Here the gear 17, driven by the lawn engaging wheel drives the pinion 18 which may be shifted by the pin or shaft 19 to unclutch the same from the gear 23, as described in connection with Fig. 3. The pinion 26 is secured upon and drives the short shaft 27 which in turn drives a cutter mechanism shaft 37 through the universal joint 43, 42. The ball bearing 28 for the shaft 27 is carried on an arm 67 freely pivoted upon the shaft or pin 19, and the gear casing 15 has an elongated slot or opening 68 which allows the pinion 26 to move around or upon the gear 23, so that the shaft 27 may rise or fall, within limits, due to the rising and falling of the cutter mechanism driven thereby and so assist in accommodating the cutter mechanism to variations in the surface of the lawn.

In Figs. 6 and 7 is shown a form of gang lawn mower in which all of the cutter mechanisms are driven in common from the lawn engaging wheels 1 and 2.

Each lawn engaging wheel is provided with two sets of gears of the character illustrated in Fig. 3, the gear casings 15 for the same being interconnected or tied together by the tie rods 69 and 70 between which is disposed the transverse frame sill 71 secured by brackets 72, Fig. 7, to the gear casings. To the front transverse sill 73 is secured a bracket 74 having the horizontal pivot 75 upon which may rock the member 76 carrying the horizontal pivot 77 on which may transversely rock the member 78 secured to the cutter mechanism frame members 79 of the front or leading cutter mechanism having the shaft 80 having bearings in the members 79, and having the ground engaging roller 81. Each end of the shafts 80 is connected through a universal joint 82 with a shaft 83 slidable longitudinally within the sleeve 84, the shaft 83 and sleeve 84 being supplied with a feather or key 85, Fig. 8, which causes the shaft 83 to be driven by the sleeve 84 in any position that the shafts 83 and 84 may take relative to each other in their relative longitudinal movements. The sleeves 84 are driven through universal joints 86 from one of the gear trains of each of the lawn engaging wheels 1 and 2.

To the rear of the leading or forward cutting mechanism are two other similar cutter mechanisms, the outer ends of whose shafts 80 are driven through the universal joints 87 and 88 by the second gear trains driven by the wheels 1 and 2. And the inner ends of the shafts 80 are connected through universal joints 89 with the shaft 90 and sleeve 91, telescoping on each other, but feathered or keyed as in Fig. 8. The members 78 of the rear cutter mechanisms may rock laterally upon the horizontal pivots 92, Fig. 7, carried by the vertically swinging arms 93 pivoted on the pins 94 carried by the frame or body, which comprises, in addition to the sills 71 and 73, the rear sill 95 and the end sills 96.

On the rear sill 95 is secured the downwardly extending bracket 97 in which is pivoted the caster 98 carrying the ground engaging roller 99.

Here the operation is again similar to that previously described, in that as the wheels 1 and 2 are rotated by forward movement of the gang mower, the mower mechanisms are driven from the several gear trains through the universal joints, and these cutter mechanisms may rock laterally and rise and fall vertically with respect to each other while maintaining driving connections with each other and with the common driving lawn engaging wheels. And in taking a curvilinear path and turning corners the action is simple and easy and the cutter mechanisms continue to rotate and they may yield with respect to each other through the universal joints and through the telescopic connections by shafts 83 and sleeves 84.

When the swinging pinion structure shown in Figs. 4 and 5 is not employed in the modifications of Figs. 1 and 6, the universal joint sections 41 and 42 of Fig. 1, and 87 and 88 of Fig. 6 are connected in each case by a sliding sleeve joint such as that shown in Fig. 8.

What I claim is:

1. A gang lawn mower comprising a lawn engaging wheel, a plurality of cutter mechanisms, a train of gearing driven by said wheel, and universal joint connections between said cutter mechanisms and said gearing whereby said cutter mechanisms are driven in common from said wheel.

2. A gang lawn mower comprising a lawn engaging wheel, a train of gearing driven thereby, a plurality of cutter mechanisms in transverse alinement with each other, a universal joint connection between said cutter mechanisms, and a universal joint connection between one of said cutter mechanisms and said gearing, whereby said lawn engaging wheel drives said cutter mechanisms.

3. A gang lawn mower comprising a lawn engaging wheel, a train of gearing driven thereby, a plurality of cutter mechanisms in transverse alinement with each other, a universal joint connection between said cutter mechanisms, a universal joint connection between one of said cutter mechanisms and said gearing, whereby said lawn engaging wheel drives said cutter mechanisms, an individual lawn mower unit, and a super-structure connected to said cutter mechanisms and said unit for moving them over the lawn.

4. A gang lawn mower comprising a lawn engaging wheel, a plurality of cutter mechanisms, a train of gearing driven by said wheel, universal joint connections between said cutter mechanisms and said gearing whereby said cutter mechanisms are driven in common from said wheel, a super-structure and connections between said cutter mechanisms and said super-structure allowing transverse rocking and vertical movement of said cutter mechanisms.

5. A gang lawn mower comprising a lawn engaging wheel, a train of gearing driven thereby, a plurality of cutter mechanisms in transverse alinement with each other, a universal joint connection between said cutter mechanisms, a universal joint connection between one of said cutter mechanisms and said gearing, whereby said lawn engaging wheel drives said cutter mechanisms, a super-structure and connections between said cutter mechanisms and said super-structure allowing transverse rocking and vertical movement of said cutter mechanisms.

6. A gang lawn mower comprising a lawn engaging wheel, a train of gearing driven thereby, a plurality of cutter mechanisms in transverse alinement with each other, a universal joint connection between said cutter mechanisms, a universal joint connection between one of said cutter mechanisms and said gearing, whereby said lawn engaging wheel drives said cutter mechanisms, an individual lawn mower unit, a super-structure for moving said cutter mechanisms and said unit over the lawn, and means connecting said super-structure to said cutter mechanism and to said individual unit allowing transverse rocking and vertical movement of said cutter mechanisms and said individual unit.

7. A gang lawn mower comprising a plurality of lawn engaging wheels, a gear train driven by each of said wheels, a plurality of cutter mechanisms, a universal joint connection between said cutter mechanisms and said gear trains, and a universal joint connection between said cutter mechanisms.

8. A gang lawn mower comprising a plurality of lawn engaging wheels, a plurality of gear trains driven by each of said wheels, cutter mechanisms disposed in different ranks driven by the different gear trains, and universal joint connections through which said cutter mechanisms are driven by said gear trains.

9. A gang lawn mower comprising a plurality of lawn engaging wheels, a plurality of gear trains driven by each of said wheels, cutter mechanisms disposed in different ranks driven by the different gear trains, universal joint connections through which said cutter mechanisms are driven by said gear trains, and a universal joint connection between the cutter mechanisms in the same rank.

10. A gang lawn mower comprising a plurality of lawn engaging wheels, a plurality of gear trains driven by each of said wheels, cutter mechanisms disposed in different ranks driven by the different gear trains, and telescoping universal joint connections through which said cutter mechanisms are driven by said gear trains.

11. A gang lawn mower comprising a plurality of lawn engaging wheels, a plurality of gear trains driven by each of said wheels, cutter mechanisms disposed in different ranks driven by the different gear trains, telescoping universal joint connections through which said cutter mechanisms are driven by said gear trains, and a telescoping universal joint connection between the cutter mechanisms in the same rank.

12. Lawn mower mechanism comprising a lawn engaging wheel, a train of gearing comprising a gear and a pinion driven by said wheel, cutter mechanism, a universal joint connection between said pinion and said cutter mechanism, and means permitting arcuate movement of said pinion with respect to said gear.

In testimony whereof I have hereunto affixed my signature this 30th day of June, 1916.

JOHN F. BRAUN.

It is hereby certified that in Letters Patent No. 1,235,649, granted August 7, 1917, upon the application of John F. Braun, of Merion, Pennsylvania, for an improvement in "Gang-Mowers," errors appear in the printed specification requiring correction as follows: Page 1, strike out line 99 and insert the words and reference-numerals *tie rod 29 secured to the gear casings 15.;* page 3, line 127, claim 4, and page 4, line 10, claim 5, before the word "and" insert a comma; and that the said Letters Patent should be read with these corrections therein that the same may conform to the record of the case in the Patent Office.

Signed and sealed this 28th day of August, A. D., 1917.

[SEAL.] 
R. F. WHITEHEAD,
*Acting Commissioner of Patents.*

Cl. 56—19